(12) United States Patent
Formanek et al.

(10) Patent No.: US 6,379,739 B1
(45) Date of Patent: Apr. 30, 2002

(54) ACIDULANT SYSTEM FOR MARINADES

(75) Inventors: Joseph A. Formanek, Bolingbrook; Pamela Tang, Oak Brook, both of IL (US)

(73) Assignee: Griffith Laboratories Worldwide, Inc., Alsip, IL (US)

( * ) Notice: Subject to any disclaimer, the term of this patent is extended or adjusted under 35 U.S.C. 154(b) by 56 days.

(21) Appl. No.: 09/665,802

(22) Filed: Sep. 20, 2000

(51) Int. Cl.⁷ .............................................. A23L 1/221
(52) U.S. Cl. ..................... 426/650; 426/589; 426/281; 426/302; 426/310
(58) Field of Search ................................ 426/589, 650, 426/281, 302, 310

(56) References Cited

U.S. PATENT DOCUMENTS

| | | |
|---|---|---|
| 3,615,594 A | 10/1971 | Stewart |
| 3,778,513 A | 12/1973 | Shiga |
| 4,096,286 A | 6/1978 | Sakakibara |
| 4,241,095 A | 12/1980 | Shibata |
| 4,258,072 A | 3/1981 | Eguchi |
| 4,299,856 A | 11/1981 | Zirbel |
| 4,352,832 A | 10/1982 | Wood |
| 4,720,390 A | 1/1988 | Bächler |
| 4,840,806 A | 6/1989 | Hyldon |
| 4,927,657 A | 5/1990 | Antaki |
| 4,944,957 A | 7/1990 | Kingsley |
| 5,104,679 A | 4/1992 | Jurcso |
| 5,279,845 A | 1/1994 | Nozaki |
| 5,284,673 A | 2/1994 | Nozaki |
| 5,302,406 A | 4/1994 | Ludwig |
| 5,320,860 A | 6/1994 | Duval |
| 5,324,534 A | 6/1994 | Stevens |
| 5,356,647 A | 10/1994 | Mason |
| 5,436,017 A | 7/1995 | Ludwig |
| 5,451,420 A | 9/1995 | Brain |
| 5,562,942 A | 10/1996 | Koh |
| 5,562,943 A | 10/1996 | Koh |
| 5,614,241 A | 3/1997 | Monte |
| 5,654,027 A | 8/1997 | Chalupa |
| 5,693,359 A * | 12/1997 | Wood .................. 426/650 |
| 5,711,985 A | 1/1998 | Guerrero |
| 5,747,081 A | 5/1998 | Lee |
| 5,948,452 A | 9/1999 | Monte |
| 6,007,856 A | 12/1999 | Cox |
| 6,013,294 A | 1/2000 | Bunke |
| 6,331,296 B1 * | 12/2001 | Prusiner et al. .......... 424/78.08 |

* cited by examiner

*Primary Examiner*—Nina Bhat
(74) *Attorney, Agent, or Firm*—Michael Best & Friedrich, LLC

(57) ABSTRACT

An acidulant system for marinades for meat and fish comprising sodium citrate and citric acid in specified ranges.

24 Claims, No Drawings

ACIDULANT SYSTEM FOR MARINADES

BACKGROUND

The present invention relates generally to marinades for meat and fish and, more particularly, to an acidulant system for marinades which enables the marinades to deliver a strong sour flavor with minimal textural degradation in the substrate meat or fish.

A marinade is a seasoned liquid in which foods such as meat and fish are soaked (marinated) in order to absorb desirable flavors. Most marinades contain herbs, spices and other ingredients. In the event that a sour flavor is desired in the finished product, marinades may include an acidulant (lemon juice, vinegar or wine) as well. In order to generate sufficient sour flavor in the marinated product, a high level of acid is necessary; this typically brings the pH of the marinade to below pH 2.0. Unfortunately, marinades which contain such very acidic acidulants producing these low pH's tend to degrade the texture and negatively affect the overall quality of the substrate meat or fish. Also, since marinades are often applied by soaking the meat or fish substrate in the marinade so that the substrate absorbs the flavors, marinating by soaking in very acidic marinades must be done in acid resistant containers made of glass, ceramic, or stainless steel.

The present invention provides an acidulant ingredient for marinades which is far less acidic than conventional acidulants, yet delivers strong sour flavor and causes minimal textural degradation.

SUMMARY OF THE INVENTION

The present invention comprises a unique combination of citric acid and sodium citrate producing an acidulant system with a pH in the range of about 2.5 to 5, and preferably in the range of about 3.25 to 4.25, which is intended to be delivered to the substrate meat or fish at a level in the range of about 0.1 to 0.35% based on the weight of the substrate. Delivery of the acidulant system refers to the amount available to be absorbed by the substrate, e.g., 1 gram of acidulant in the marinade going into 100 grams of meat would produce a 1% delivery.

For meat (chicken, beef and pork), the respective delivered levels of citric acid and sodium citrate in the acidulant system are determined by the formula:

$$a=y/x^2$$

where a is about 7.5 to 14, preferably about 8 to 12, and most preferably about 11.1, y is the percentage by weight of sodium citrate to be delivered to the substrate based on the weight of the substrate, and x is the percentage by weight of citric acid to be delivered to the substrate based on the weight of the substrate. Additionally, x must lie in the range of about 0.1% to 0.4%. A preferred composition will contain 0.18% by weight delivered citric acid and 0.36% by weight delivered sodium citrate. For example, for different a's, x and y may have the following values with x and y listed in percentages by weight delivered:

| a | x | y |
|---|---|---|
| 8 | 5 | 2.0 |
|  | 15 | 18.0 |
|  | 25 | 50.0 |
| 10 | 5 | 2.5 |
|  | 15 | 2.3 |
|  | 25 | 63.0 |
| 12 | 5 | 3.0 |
|  | 15 | 33.0 |
|  | 25 | 75.0 |
| 14 | 5 | 3.5 |
|  | 15 | 31.0 |
|  | 25 | 88.0 |

For seafood (fish and shrimp), the delivered acidulant of the present invention is determined by the formula:

$$b=y/x^2$$

where b equals from about 10 to 16, preferably about 12.5 to 15, and most preferably is about 13.8, y is the percentage by weight of sodium citrate to be delivered to the substrate based on the weight of the substrate, and x is the percentage by weight of citric acid to be delivered to the substrate based on the weight of the substrate. Also, x must be in the range of about 0.1 to 0.19% delivered citric acid. For example, in a preferred embodiment, x will be about 0.14%, y will be about 0.27%, and b will be about 13.8.

The above-described acidulant system may be used in a wide variety of marinades where it is desired to deliver a strong sour or very acidic flavor. The other ingredients of the marinades will include water and other flavors such as lemon, lime, mustard, etc. as well as neutral ingredients like starches and other thickeners. Without limiting the applicability of the acidulant system of the present invention to marinades of any suitable kind, the following table lists an exemplary marinade formulation:

| INGREDIENT LISTING | OTHER POSSIBLE INGREDIENTS |
|---|---|
| for lemon herb chicken (dry marinade composition) | coriander, sage, oregano, monosodium glutamate |
| 30%–40% salt | celery, clove, chili pepper, cinnamon |
| 15%–20% sugar | soy protein concentrate, soy sauce |
| 15%–20% starch | ginger, butter, silicon dioxide |
| 10%–15% total spices (basil, rosemary, thyme) | parsley, dextrose, turmeric, hydrolyzed vegetable protein |
| 4%–6% onion | cilantro, bell pepper, masa flour |
| 4%–6% garlic | flavors (lime, orange, wine, grill) |
| 3%–5% black pepper | orange peel, flavor oils |
| 3%–5% autolyzed yeast extract | |
| 2%–4% sodium citrate | |
| 1%–3% citric acid | |
| 1%–2% flavors | |
| 0.5%–1% anti-caking/free flow agent | |

The above marinade would be mixed and reconstituted when desired at a level of 20%–30% dry marinade to 70%–80% water, on a weight basis. This reconstituted marinade would then be used at a 10%–20% (w/w) level of marinade to chicken (i.e., 10 g to 20 g liquid marinade to 100 g substrate meat).

Marinades containing the acidulant system of the invention may be applied by any of the known techniques for marinating either on a small scale or a commercial scale. For example, on a small scale they may be applied, preferably under refrigeration at about 4° C., by static soaking the meat or fish in a container for about 2 to 3 hours. On a large scale, the marinades may be applied, preferably under refrigeration at about 4° C., by tumbling the meat or fish in tumbler containers for pre-arranged times (typically on the order of about 30 minutes), or by injecting the marinade directly into the substrate. For example, for chicken applications, the marinade is typically injected at a 10% (w/w) level followed by tumbling at 60 rpm for 30 minutes with or without vacuum. Alternatively, the chicken may be tumble marinated at the same level of marination at 60 rpm for 30 minutes with or without vacuum.

Additionally, it is noted that citrates other than sodium citrate may be used where government regulations allow and the differing flavor notes associated with the different citrates are desired. Thus, in lieu of some or all of the sodium citrate, any one of the following may be used: ammonium citrate, calcium citrate, magnesium citrate, citrate.

The following examples are provided to further illustrate the present invention.

EXAMPLE 1

A series of boneless chicken substrate samples were marinated by injection at 20% followed by tumbling for about 30 minutes at 4° C. using control formulations as well as a series of different marinade systems. The control and marinade formulations were as follows:

| FORMULATION NO. | INGREDIENTS |
|---|---|
| 1 | water (water control) |
| 2 | water + 1% delivered salt (salt control) |
| 3 | water + 0.2% delivered citric acid + 1% delivered salt (acid and salt control) |
| 4 | water + 0.2% delivered citric acid + 1% delivered salt + 0.5% delivered phosphate (acid/salt/phosphate control) |
| 5 | water + 1% delivered salt + 0.5% delivered phosphate (salt and phosphate control) |
| 6 | water + 0.2% delivered citric acid + 0.2% delivered sodium citrate |
| 7 | water + 0.2% delivered citric acid + 0.3% delivered sodium citrate |

The raw weight of the boneless chicken breast substrate samples was taken before tumbling in the test formulations. The weight of the samples was then taken after tumbling in the formulation for 30 minutes, after refrigerating for one week at about 2° C., and after cooking at about 165° F. for about 10 minutes. The percentage weight loss was calculated as "purge loss" after the one week of storage. Also, a calculation was made to determine the percentage of the raw weight of the test samples remaining after cooking. The data obtained was as follows (as an average of five test runs):

than that of sample 3 (acid+salt control). Additionally, in comparison to samples 4 and 5, which represent the industry standard phosphate treatments to improve water retention (as well as maintain texture and juiciness), sample 7 showed roughly equivalent to better yield loss.

EXAMPLE 2

Ten sensory panelists trained in descriptive analysis of a wide range of food products were specifically instructed in the different textural attributes that they may see in acidulants for meat and chicken marinades, and then asked to compare various organoleptic properties of a control boneless chicken breast test sample and a prepared boneless chicken breast test sample in accordance with the present invention. The control sample used a lemon herb flavoring containing 0.2% delivered citric acid as the acidulant and no sodium citrate, and the test sample used the same lemon herb flavoring but with 0.2% delivered citric acid and 0.3% delivered sodium citrate at a value of a of 7.5. Citric acid is a common acidulant for use in citric products, such as lemon flavored products. The rest of the formula for the lemon herb flavoring contained, in addition to the citric acid, salt, herbs and spices, and other functional ingredients. The sensory panel results were as follows:

| ORGANOLEPTIC PROPERTIES | CONTROL | TEST SAMPLE |
|---|---|---|
| 1 hardness | higher | |
| 2 cohesiveness | | higher |
| 3 juiciness | | higher |
| 4 moisture adsorption | higher | |
| 5 moistness of mass | | higher |
| 6 number of chews | higher | |
| 7 fibers in teeth | | higher |

The above data indicates that the textural organoleptic properties of the test samples were substantially preferable to the control in terms of hardness, cohesiveness, juiciness, moistness of mass, and number of chews. Also, the corre

| SAMPLE | a | X | Y | pH | RAW WEIGHT | WEIGHT AFTER TUMBLE | ONE WEEK STORAGE WEIGHT | ONE WEEK PURGE LOSS | POST-COOK WEIGHT | % RAW WEIGHT |
|---|---|---|---|---|---|---|---|---|---|---|
| 1 water control | | n/a | n/a | 7.0 | 115 g | 141 g | 126 g | 10.5% | 93 g | 80.9% |
| 2 salt control | | n/a | n/a | 6.5 | 124 g | 155 g | 149 g | 3.9% | 128 g | 103.2% |
| 3 acid + salt control | | .18 | n/a | 1.5 | 116 g | 146 g | 125 g | 14.4% | 88 g | 75.9% |
| 4 acid/salt/phosphate control | | .18 | n/a | 3.75 | 112 g | 139 g | 133 g | 4.3% | 111 g | 99.1% |
| 5 salt + phosphate control | | n/a | n/a | 8.25 | 116 g | 145 g | 141 g | 2.8% | 123 g | 106.0% |
| 6 acidulant marinade | 6.0 | .18 | .20 | 2.75 | 111 g | 138 g | 127 g | 8.0% | 94 g | 84.6% |
| 7 acidulant marinade | 7.5 | .18 | .36 | 3.75 | 114 g | 144 g | 139 g | 3.5% | 117 g | 102.6% |

As demonstrated in the data above, sample 7 (with a in the required range) produced minimal yield loss, and sample 6 (with a outside the required range) produced less yield loss lation between the sensory panel results for the number of chews and hardness indicates that the test sample was more tender than the control.

EXAMPLE 3

A series of boneless chicken substrate samples were marinated by tumbling at a 10% level for about 30 minutes at 4° C. in control formulations as well as in a series of different marinade systems. The control and marinade formulations were as follows:

| FORMULATION NO. | INGREDIENTS |
|---|---|
| 1 | water + 1% delivered salt + 0.2% delivered citric acid (control) |
| 2 | water + 1% delivered salt + 0.2% delivered citric acid + 0.06% delivered sodium citrate |
| 3 | water + 1% delivered salt + 0.2% delivered citric acid + 0.14% delivered sodium citrate |
| 4 | water + 1% delivered salt + 0.2% delivered citric acid + 0.30% delivered sodium citrate |
| 5 | water + 1% delivered salt + 0.2% delivered citric acid + 0.40% delivered sodium citrate |
| 6 | water + 1% delivered salt + 0.2% delivered citric acid + 1.26% delivered sodium citrate |
| 7 | water + 1% delivered salt + 0.75% delivered sodium citrate |
| 8 | water + 1% delivered salt (salt control) |
| 9 | water (water control) |

The raw weight of the boneless chicken breast samples was taken before tumbling in the test formulations. The weight of the samples was then taken after tumbling in the formulation for 30 minutes, after refrigerating for one week at about 2° C., and after cooking at about 165° F. for about 10 minutes. The percentage weight loss was calculated as "purge loss" after the one week of storage. Also, a calculation was made to determine the percentage of the raw weight of the test samples remaining after cooking. The data obtained was as follows (as an average of five test runs):

was overly sour and tough, and chicken marinated in samples 6 or 7 had little sourness but had good texture. In sum, samples 4 and 5, both of which fall within the parameters of the invention, produced the best overall results.

EXAMPLE 4

A series of shrimp substrate samples (20–24 count peeled and deveined shrimp, tail on) were marinated by tumbling about 30 minutes at 4° C. in a control formulation as well as in a series of different marinades. The control and marinade formulations were as follows:

| FORMULATION NO. | INGREDIENTS |
|---|---|
| 1 | water + 1% delivered salt + 0.14% delivered citric acid |
| 2 | water + 1% delivered salt + 0.05% delivered citric acid + 0.09% delivered sodium citrate |
| 3 | water + 1% delivered salt + 0.10% delivered citric acid + 0.16% delivered sodium citrate |
| 4 | water + 1% delivered salt + 0.14% delivered citric acid + 0.27% delivered sodium citrate |
| 5 | water + 1% delivered salt + 0.20% delivered citric acid + 0.32% delivered sodium citrate |
| 6 | water + 1% delivered salt + 0.25% delivered citric acid + 0.40% delivered sodium citrate |
| 7 | water + 1% delivered salt + 0.30% delivered citric acid + 0.48% delivered sodium citrate |
| 8 | water (control) |
| 9 | water + 1% delivered salt (salt control) |

The raw weight of the shrimp substrate samples was taken before tumbling in the test formulations. The weight of the samples was then taken after tumbling in the formulation for

| | X | Y | a | pH | RAW WEIGHT | WEIGHT AFTER TUMBLE | ONE WEEK STORAGE WEIGHT | ONE WEEK PURGE LOSS | POST-COOK WEIGHT | % RAW WEIGHT |
|---|---|---|---|---|---|---|---|---|---|---|
| 1 citric acid control | 0.2 | n/a | n/a | 1.50 | 112 g | 111 g | 100 g | 9.9% | 72 g | 64.3% |
| 2 control + 0.06% citrate | 0.2 | 0.06 | 1.5 | 2.25 | 122 g | 125 g | 116 g | 7.2% | 93 g | 76.2% |
| 3 control + 0.14% citrate | 0.2 | 0.14 | 3.5 | 3.00 | 118 g | 126 g | 118 g | 6.3% | 99 g | 83.9% |
| 4 control + 0.30% citrate | 0.2 | 0.30 | 7.5 | 3.75 | 107 g | 118 g | 112 g | 5.1% | 98 g | 91.5% |
| 5 control + 0.44% citrate | 0.2 | 0.44 | 11 | 4.25 | 112 g | 124 g | 119 g | 4.0% | 106 g | 94.6% |
| 6 control + 1.26% citrate | 0.2 | 1.26 | 32 | 5.00 | 117 g | 130 g | 125 g | 3.8% | 113 g | 96.6% |
| 7 salt + 0.75% citrate | n/a | 0.75 | n/a | 6.75 | 113 g | 125 g | 120 g | 4.0% | 106 g | 93.8% |
| 8 water control | n/a | n/a | n/a | 7.00 | 112 g | 119 g | 114 g | 4.2% | 91 g | 81.2% |
| 9 salt control | n/a | n/a | n/a | 6.50 | 109 g | 121 g | 118 g | 2.5% | 106 g | 97.2% |

As demonstrated in the data above, samples 5 and 6 produced minimal yield loss, with samples 4 and 7 producing less than seen in samples 1–3. Sample 6 delivered yield results essentially equivalent to that seen in the salt control. Sampling by trained sensory panelists indicated that overall flavor and texture was preferable in samples 4 and 5. Comments indicated that chicken marinated in samples 1–3

30 minutes, after refrigerating for one week at about 2° C., and after cooking at about 165° F. for about 4 minutes. The percentage weight loss was calculated as "purge loss" after the one week of storage. Also, a calculation was made to determine the percentage of the raw weight of the test samples remaining after cooking. The data obtained was as follows:

| Sample | X | Y | b | pH | RAW WEIGHT | WEIGHT AFTER TUMBLE | ONE WEEK STORAGE WEIGHT | ONE WEEK PURGE LOSS | POST-COOK WEIGHT | % RAW WEIGHT |
|---|---|---|---|---|---|---|---|---|---|---|
| 1 citric acid control | 0.14 | n/a | n/a | 1.80 | 98 g | 102 g | 96 g | 5.9% | 68 g | 69.4% |
| 2 | 0.05 | 0.09 | 36.0 | 4.70 | 82 g | 88 g | 85 g | 2.3% | 71 g | 86.6% |
| 3 | 0.10 | 0.16 | 16.0 | 4.45 | 85 g | 91 g | 88 g | 3.3% | 73 g | 85.9% |
| 4 | 0.14 | 0.27 | 13.8 | 4.20 | 98 g | 105 g | 102 g | 2.9% | 82 g | 83.8% |
| 5 | 0.20 | 0.32 | 8.0 | 3.65 | 105 g | 112 g | 107 g | 4.5% | 84 g | 80.0% |
| 6 | 0.25 | 0.40 | 6.4 | 3.45 | 91 g | 95 g | 90 g | 5.3% | 71 g | 78.0% |
| 7 | 0.30 | 0.48 | 5.3 | 3.20 | 87 g | 91 g | 87 g | 4.4% | 64 g | 73.6% |
| 8 water control | n/a | n/a | n/a | 7.00 | 88 g | 93 g | 89 g | 4.3% | 70 g | 79.5% |
| 9 salt control | n/a | n/a | n/a | 6.50 | 82 g | 88 g | 85 g | 3.4% | 69 g | 84.1% |

The above data, shows that samples 2, 3 and 4 gave yield loss values less than or equal to that seen with the salt control (sample 9). Samples 5, 6, and 7 had comparatively lower yields. All of the test marinades (samples 2–7) delivered comparatively better yields than did the citric acid control (sample 1). Sampling by trained panelists indicated that overall flavor and texture was preferred in samples 4 and 5. Comments indicated that shrimp marinated in samples 1–3 had a good texture but little sourness, and shrimp marinated in samples 6 or 7 was overly sour and rubbery. Thus, overall, sample 4 (b=13.8) gave the best results and sample 5 (b=8.0) was a close second.

The above preferred embodiments of the examples are given to illustrate the scope and spirit of the invention. These embodiments and the examples described will make apparent, to those skilled in the art, other embodiments of the invention. These other embodiments are within the contemplation of the present invention and, therefore, the invention should be limited only by the claims, which follow.

What we claim is:

1. An acidulant system for marinades delivering sour flavor to meat comprising percentage amounts by weight, based on the weight of the meat to be marinated, of sodium citrate(y) and citric acid(x) to satisfy the formula:

$$a=y/x^2$$

where a lies in the range of about 7.5 to 14, and x lies in the range of about 0.1 to 0.4.

2. The acidulant system of claim 1 in which a lies in the range of about 8 to 12.

3. The acidulant system of claim 1 in which a is about 11.1.

4. The acidulant system of claim 1 in which the acidulant system has a pH in the range of about 2.5 to 5.0.

5. The acidulant system of claim 1 in which some or all of the sodium citrate is replaced by citrate chosen from the group consisting of ammonium citrate, calcium citrate, magnesium citrate, and potassium citrate.

6. The acidulant system of claim 1 in which the acidulant system has a pH in the range of about 3.25 to 4.25.

7. An acidulant system for marinades delivering sour flavor to seafood comprising percentage amounts by weight, based on the weight of the seafood to be marinated, of sodium citrate(y) and citric acid(x) to satisfy the formula:

$$b=y/x^2$$

where b lies in the range of about 10 to 16, and y lies in th range of about 0.1 to 0.19.

8. The acidulant system of claim 7 in which b lies in the range of about 12.5 to 15.

9. The acidulant system of claim 7 in which b is about 13.8.

10. The acidulant system of claim 7 in which some or all of the sodium citrate is replaced by citrate chosen from the group consisting of ammonium citrate, calcium citrate, magnesium citrate, and potassium citrate.

11. The acidulant system of claim 7 in which the acidulant system has a pH in the range of about 3.25 to 4.25.

12. A marinade for delivering sour flavor to meat including an acidulant system comprising percentage amounts by weight, based on the weight of the meat to be marinated, of sodium citrate(y) and citric acid(x) to satisfy the formula:

$$a=y/x^2$$

where a lies in the range of about 7.5 to 14, and x lies in the range of about 0.1 to 0.4, as well as water, herbs and spices.

13. The marinade of claim 12 including, based on the weight of the marinade, from 0.1 to 1.5 of the acidulant system, from 80% to 90% water, and the balance herbs and spices.

14. The marinade of claim 13 in which the herbs and spices are chosen from the group consisting of basil, bell pepper, butter, celery, chili pepper, cilantro, cinnamon, clove, coriander, dextrose, ginger, hydrolyzed vegetable protein, orange peel, oregano, parsley, rosemary, sage, soy sauce, thyme, and turmeric.

15. An improved marinade for meat including water, herbs and spices wherein the improvement comprises the inclusion of an acidulant system for delivering sour flavor comprising percentage amounts by weight, based on the weight of the meat to be marinated, of sodium citrate(y) and citric acid(x) to satisfy the formula:

$$a=y/x^2$$

where a lies in the range of about 7.5 to 14, and x lies in the range of about 0.1 to 0.4.

16. An improved marinade for seafood including water, herbs and spices wherein the improvement comprises the inclusion of an acidulant system for delivering sour flavor to the seafood comprising amounts by weight, based on the weight of the seafood to be marinated, of sodium citrate(y) and citric acid(x) to satisfy the formula:

$$b=y/x^2$$

where b lies in the range of about 10 to 16, and y lies in the range of about 0.1 to 0.19.

17. A method of marinating meat to impart a sour flavor comprising treating the meat with a marinade including an acidulant system comprising amounts by weight, based on the weight of meat to be marinated, of sodium citrate(y) and citric acid(x) to satisfy the formula:

$$a=y/x^2$$

where a lies in the range of about 7.5 to 14, and x lies in the range of about 0.1 to 0.4.

18. The method of claim 17 in which the meat is marinated by tumbling.

19. The method of claim 17 in which the meat is marinated by injection.

20. The method of claim 17 in which the meat is marinated by static soaking.

21. A method of marinating seafood to impart sour flavor comprising treating the seafood with a marinade including an acidulant system comprising amounts by weight, based on the weight of the seafood to be marinated, of sodium citrate(y) and citric acid(x) to satisfy the formula:

$$b=y/x^2$$

where b lies in the range of about 10 to 16, and y lies in the range of about 0.1 to 0.19.

22. The method of claim 21 in which the seafood is marinated by tumbling.

23. The method of claim 21 in which the seafood is marinated by injection.

24. The method of claim 21 in which the seafood is marinated by static soaking.

\* \* \* \* \*

UNITED STATES PATENT AND TRADEMARK OFFICE
CERTIFICATE OF CORRECTION

PATENT NO.     : 6,379,739 B1
DATED          : April 30, 2002
INVENTOR(S)    : Formanek et al.

It is certified that error appears in the above-identified patent and that said Letters Patent is hereby corrected as shown below:

Column 3,
Line 12, after "citrate," insert -- or potassium --
Line 19, after "20%" insert -- level --
Bottom Chart, 1st line, delete "10.5%" and insert -- 10.6% --

Column 7,
Line 64, delete "th" and insert -- the --

Signed and Sealed this

Twenty-ninth Day of April, 2003

JAMES E. ROGAN
*Director of the United States Patent and Trademark Office*